United States Patent [19]
Elqadah et al.

[11] Patent Number: 5,470,097
[45] Date of Patent: Nov. 28, 1995

[54] CLOSURE FOR AIR BAG INSTALLATION

[75] Inventors: Wael S. Elqadah, North Ogden; Bradley D. Harris, Farmington, both of Utah

[73] Assignee: Morton International, Inc., Chicago, Ill.

[21] Appl. No.: 116,942

[22] Filed: Sep. 3, 1993

[51] Int. Cl.⁶ .................................................. B60R 21/16
[52] U.S. Cl. ................... 280/728.3; 280/732; 280/728.1
[58] Field of Search ............................ 280/728 B, 728 R, 280/750, 732, 731

[56] References Cited

U.S. PATENT DOCUMENTS

| 3,622,176 | 11/1971 | Byer | 280/150 |
|---|---|---|---|
| 3,822,894 | 7/1974 | Muller et al. | 280/87 R |
| 4,148,503 | 4/1979 | Shiratori et al. | 280/728 B X |
| 4,334,699 | 6/1982 | Patzelt et al. | 280/731 |
| 4,752,083 | 6/1988 | Honda | 280/731 |
| 4,852,907 | 4/1989 | Shiraki et al. | 280/731 |
| 4,893,833 | 1/1990 | DiSalvo et al. | 280/732 |
| 4,964,652 | 10/1990 | Karlow | 280/731 |
| 4,964,653 | 10/1990 | Parker | 280/732 |
| 5,002,307 | 3/1991 | Heidorn | 280/731 |
| 5,013,065 | 5/1991 | Kreuzer | 280/743 |
| 5,060,971 | 10/1991 | Nanbu et al. | 280/728 |
| 5,064,217 | 11/1991 | Shiraki | 280/728 B |
| 5,069,477 | 12/1991 | Shiraki | 280/732 |
| 5,087,071 | 2/1992 | Wallner et al. | 280/743 |
| 5,096,220 | 3/1992 | Nakajima | 280/728 B |
| 5,143,401 | 9/1992 | Zushi | 280/731 |
| 5,150,919 | 9/1992 | Sakakida et al. | 280/732 |
| 5,183,289 | 2/1993 | Zeller et al. | 280/728 B |
| 5,195,776 | 3/1993 | Sakakida et al. | 280/732 |
| 5,203,586 | 4/1993 | Niwa et al. | 280/728.13 |

FOREIGN PATENT DOCUMENTS

| 4328055 | 11/1992 | Japan | 280/728 B |
|---|---|---|---|

Primary Examiner—Margaret A. Focarino
Assistant Examiner—Christopher Ellis
Attorney, Agent, or Firm—Nick C. Kottis; Gerald K. White

[57] ABSTRACT

A closure element for an air bag deployment opening of an inflatable restraint system is provided. The closure element includes tear ways defining one or more doors which permit an air bag to deploy therethrough. The closure element includes at least one integral retention bridge joining such a door with the remainder of the closure.

20 Claims, 5 Drawing Sheets

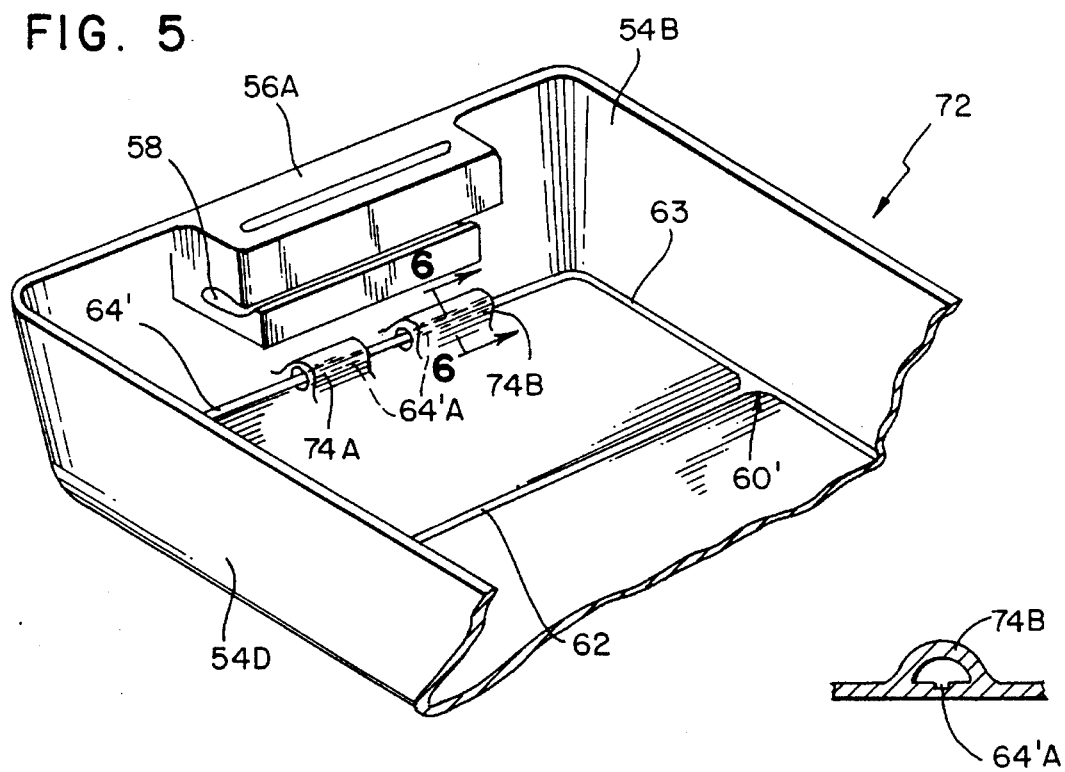
FIG. 5
FIG. 6
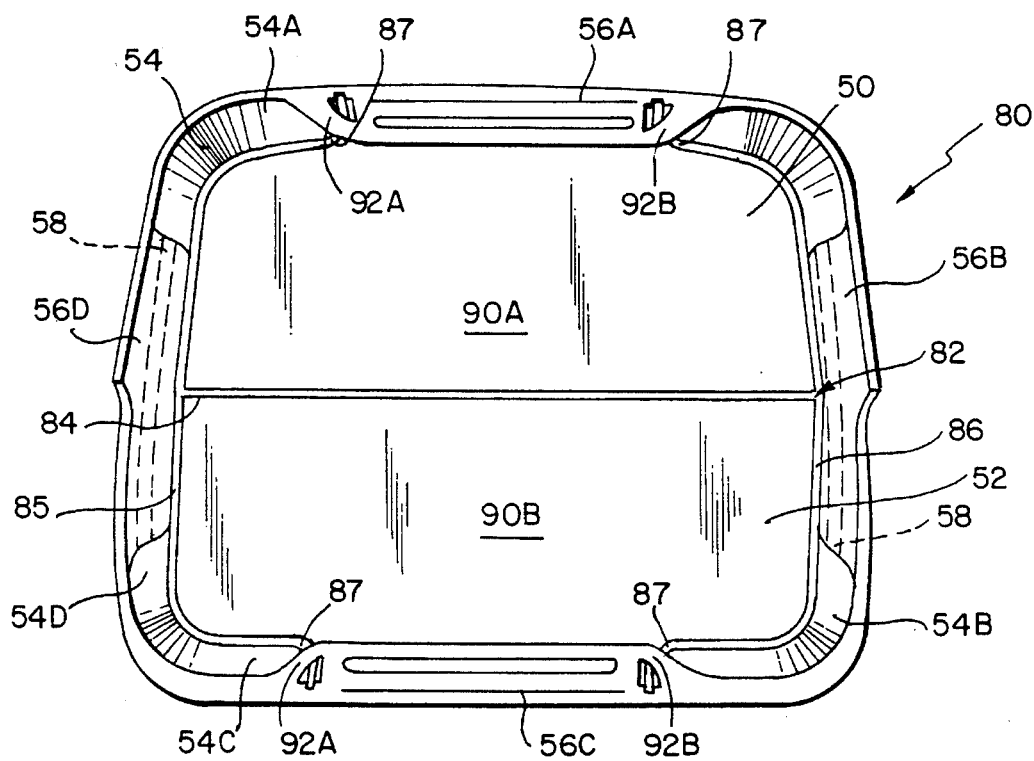
FIG. 7

CLOSURE FOR AIR BAG INSTALLATION

BACKGROUND OF THE INVENTION

This invention relates generally to inflatable restraint systems and, more particularly, to an improved closure element for use with an installation of an inflatable cushion, commonly referred to as an air bag.

The value of safety restraint systems which self-actuate from an undeployed to a deployed state without the need for intervention by the operator, i.e., "passive restraint systems", and particularly those restraint systems incorporating inflatable bags or cushions has gained general appreciation.

It is well known to protect a vehicle occupant using a cushion or bag that is inflated with gas, e.g., an "air bag", when the vehicle encounters sudden deceleration, such as in a collision. During deployment, the rapidly evolving gas with which the bag is typically filled is an inert gas, e.g., nitrogen. In such systems, the cushion is normally housed in an uninflated and folded condition to minimize space requirements.

Upon actuation of the air bag system, gas is discharged from an inflator to rapidly inflate the bag. In general, such systems are designed to result in inflation of the air bag in a matter of a few milliseconds and with the bag thus serving to restrain the movement of the vehicle occupant as the collision proceeds.

For typical driver side inflators used in conventional air bag systems, gas pressure ranges between 250–650 kPa, as determined by tank testing wherein the inflator is actuated and exhausted into a one cubic foot volume tank with the pressure in the tank measured at fifty milliseconds after actuation. Those inflators that result in such gas pressures ranging from about 450–475 kPa up to about 650 kPa are hereinafter referred to as high pressure inflators.

Inflatable restraint systems have been devised for automotive vehicles in which one or more air bags are stored in one or more storage compartments within the vehicle. In general, an air bag provided for the protection of a vehicle driver, i.e., a driver side air bag, is stored within a module including an inflator, the air bag itself, a housing, a cover or some form of closure panel member, and attachment means mounted in the steering wheel of the vehicle. Whereas, an air bag for the protection of a front seat passenger, i.e., a passenger side air bag, is typically stored within a module mounted in the instrument panel/dash board of the vehicle. The covers of such installations commonly include a face portion which, in the standard state, provides closure to the assembly. Upon activation of the system and initial bag deployment, the cover typically forms one or more "doors" which hinge to form an opening through which the air bag will be deployed.

In order to improve the aesthetic appearance of the closure and to reduce the likelihood of tampering with the system, closure panel members are commonly designed so as to minimize the visual impression of the presence of the air bag and air bag deployment opening thereunder. Thus, such closure panel members are typically designed to match or otherwise be compatible with the interior design of the vehicle.

In addition, appearance or otherwise cosmetic problems such as closure read through and sink marks are also sought to be avoided. Read through (e.g., where shapes or features on the backside of the closure can be relatively easily discerned from a viewing of the front side of the closure) and sink marks (e.g., where the closure has an undesired, lower or uneven outer surface) can result from processing. For example, when the closure is prepared by molding fabrication of a thermoplastic material, an uneven shrinkage of the closure material upon processing can result in read through and/or sink marks. Such uneven shrinkage can, for example, occur as a result of the item being processed having relatively widely varying thicknesses- and thus varying processing time and condition requirements.

In practice, closure panel members are commonly designed so that the face portion of the closure can be torn or otherwise opened along predetermined lines as a result of the force exerted against the closure by way of the inflating air bag and, thus, form air bag release doors. To this end, the closure is typically pre-weakened, such as by perforating or reducing the thickness of the cover, for example, along such preformed tear lines, paths or seams, generally commonly referred to herein as "tear ways". It will be recognized that the tearing or opening of such closure panel members will typically follow the path of least resistance or highest stress and thus, typically result in the opening or tearing of the closure advancing along the thinnest or weakest path through the closure.

Furthermore, primarily to facilitate manufacture and operation, the face portion of prior art closures are commonly of uniform thickness except for the tear ways such as described above. Upon formation, the doors commonly remain joined to the closure via one or more hinge sections which permit the doors to move allowing the air bag to deploy through the resulting opening.

The component parts of such closures, fabricated from the thermoplastic rubber SANTOPRENE (a trademark of Monsanto Company), commonly have the following thicknesses:

| PART | THICKNESS (mm) |
| --- | --- |
| Door | 2–3 |
| Tear ways | 0.4–1.1 |
| Hinge | 1.6–3 |

As will be appreciated, the air bag deployment process is of necessity a very rapid process and, at least partially as a result thereof, commonly results in the door or doors opening with such force and energy that the closure can tear in an undesired and/or uncontrolled manner, such as tearing outside of the tear way such as into or through the hinge section joining the air bag deployment door with the assembly. In addition, once tearing of a part or a material has initiated, such tearing can be especially difficult to control or terminate as the tearing action, particularly in some plastic materials, once initiated has a tendency to propagate therethrough. Whereas undesired tear initiation in a part or a material is generally a more difficult proposition and occurs relatively infrequently.

Such undesired and/or uncontrolled tearing of the closure can result in the air bag closure breaking into or forming separate pieces. For example, should the tearing action proceed through the hinge section joining the door to the balance of the closure and/or assembly, the air bag release doors can become detached from the closure or the balance of the system installation or otherwise break into separate pieces. Such detached doors or fragments thereof could then undesirably come in contact with a vehicle occupant. Also, those closures used in conjunction with high pressure inflators may be more prone to detachment.

Various approaches have been employed in an attempt to overcome problems of excessive closure tearing, fragmentation and/or door detachment. Unfortunately, many of the approaches are so burdensome as to limit the flexibility and freedom in the designing of closures for specific installations and the operation thereof. In addition, many of the approaches invariably significantly increase the costs, e.g., manufacturing cost, production cost, etc., associated with such installations.

In one approach, strips or straps of material are used in the securing of the cover/door to the vehicle and/or assembly. In general, patents relating to such an approach specify the bolting, riveting or otherwise fastening of a first end of such strips or straps to the cover/door and similarly bolting, riveting or otherwise fastening an opposed second end of the strip or strap to the vehicle or to the reaction housing used in the air bag assembly. Examples of such U.S. Pat. Nos. include: 3,822,894; 4,893,833; and 5,150,919.

An approach which has found use in conjunction with high pressure inflator installations involves embedding a reinforcing band or web of a highly tear resistant material within a less tear resistant outer cover material. For example, closures used in conjunction with high pressure inflators are commonly constructed of reinforced urethane. Such reinforced urethane is typically in the nature of a reaction injection molded urethane, wherein a chemical reaction occurs in the mold during the fabrication and wherein a reinforcement insert such as of nylon is utilized.

U.S. Pat. Nos. 4,334,699 and 4,752,083 teach embedding a tear resistant band or a reinforcing element, respectively, in a rupturable cover. In general, the inclusion of such a secondary material within a closure almost invariably increases processing complexity, reduces design flexibility and increases cost.

Still another approach has been to vary or alter the shape, size, or dimensions of the tear or break lines of a closure such as fabricated of thermoplastic using a one-shot injection molding process. For example, U.S. Pat. No. 5,013,065 discloses the use of a rupturable cover having break lines of continuously increasing thickness. U.S. Pat. No. 3,622,176 discloses using V-shaped grooves along the fracture lines and hinge elements having rounded root grooves, so as to avoid fracture. U.S. Pat. No. 5,060,971 discloses using a cover whose thickness is specifically varied along the tear seam. Another example of such an approach is the use of a closure wherein the thickness of the tear ways is gradually increased as the longitudinal end of the tear way is approached.

Other or similar cover groove geometries are shown in other patents including U.S. Pat. Nos. 4,964,652; 5,002,307; 5,069,477; 5,087,071; and 5,143,401.

In addition, tear ways with graduated or steadily varying thickness have been used in an attempt to provide a more controlled tearing of the closure. While the utilization of designs having tear ways which vary in thickness typically provides greater control over the closure opening process including the site of the initial opening, such designs generally increase the likelihood of certain undesirable forms of closure tearing, such as tearing outside of the tear path. For example, when a closure is undergoing tearing along a tear path and the tearing action reaches a point in the tear way at which there is an abrupt increase in the thickness of the tear way, the abrupt change in thickness can result in tearing outside of the tear path. In the case of a tear way of gradually increasing thickness, as the thickness of the tear way increases, the difference in thickness of material at the tear way and the adjacent sections of the face portion diminishes, increasing the likelihood of non-tear way tearing of the closure.

SUMMARY OF THE INVENTION

A general object of the invention is to provide an improved closure element for use with an installation of an inflatable air bag.

A more specific objective of the invention is to overcome one or more of the problems described above.

The general object of the invention can be attained, at least in part, through a specified closure element for an air bag deployment opening of an inflatable restraint system. Such a system is adapted to be integrated into a vehicle and includes a housing for accommodating a collapsed inflatable air bag. The closure element includes a mounting portion securable to the housing of the system. The closure element also includes a face portion having a tear way therein adapted to tear to define at least one air bag release door. The closure element also includes, extending across and parallel at least a portion of the tear way, at least one integral retention bridge joining the door with the mounting portion of the closure element.

The prior art fails to disclose or suggest such door retaining bridges. The invention provides an efficient and effective solution to cover door detachment without requiring the introduction of a secondary material or interfering with the advancing of the tearing action along a closure tear way. The avoidance of door detachment is particularly highlighted in those inflatable restraint system applications utilizing high pressure inflators, wherein the doors may be subjected to especially significant forces.

The invention further comprehends an alternative embodiment of a closure element for an air bag deployment opening of an inflatable restraint system, adapted to be integrated into a vehicle and including a housing for accommodating a collapsed inflatable air bag. The closure element includes a mounting portion and a face portion. The mounting portion is securable to the housing. The face portion has therein a tear way adapted to tear to define at least one air bag release door. The closure also includes a hinge section adapted to join the release door with the mounting portion with the tear way extending into the hinge section. The closure element additionally includes at least one integral retention bridge joining the door with the mounting portion, across and parallel at least a portion of the tear way.

In another embodiment of the invention, a molded plastic closure element for an air bag deployment opening is provided having a tear way adapted to tear to define at least one air bag release door and a hinge section forming a hinge adapted to join the release door with the mounting portion of the closure element. The closure element additionally includes at least one integral retention bridge joining the door with the mounting portion.

Other objects and advantages will be apparent to those skilled in the art from the following detailed description taken in conjunction with the appended claims and drawings.

BRIEF DESCRIPTION OF THE DRAWINGS

FIG. 5 is a simplified perspective bottom angle fragmentary view, similar to FIG. 2, of the closure shown in FIGS. 3–4.

FIG. 6 is a detail fragmentary view of the closure illustrated in FIGS. 3–5 taken substantially along the line 6–6 of FIG. 5 and viewed in the direction of the arrows.

FIG. 7 is a simplified bottom plan view of a closure for an air bag assembly, inflatable restraint system, in accordance with an alternative embodiment of the invention.

For ease of illustration and discussion, like parts in the prior art assembly embodiment (FIGS. 1–2) and in each of the first, second, and third illustrated embodiments of the invention (FIGS. 3–6, 7–9, and 10, respectively) are designated by the same reference numeral.

DETAILED DESCRIPTION OF THE INVENTION

The present invention, as is described in more detail below, provides an improved closure for an inflatable restraint system, e.g., for an air bag deployment opening of an air bag assembly. While the invention will be described with reference to a driver side inflatable restraint module assembly for automotive vehicles including vans, pick-up trucks, and particularly automobiles, it is to be understood that the invention also has applicability with other types or kinds of air bag module assemblies including passenger side assemblies.

Figure 1:
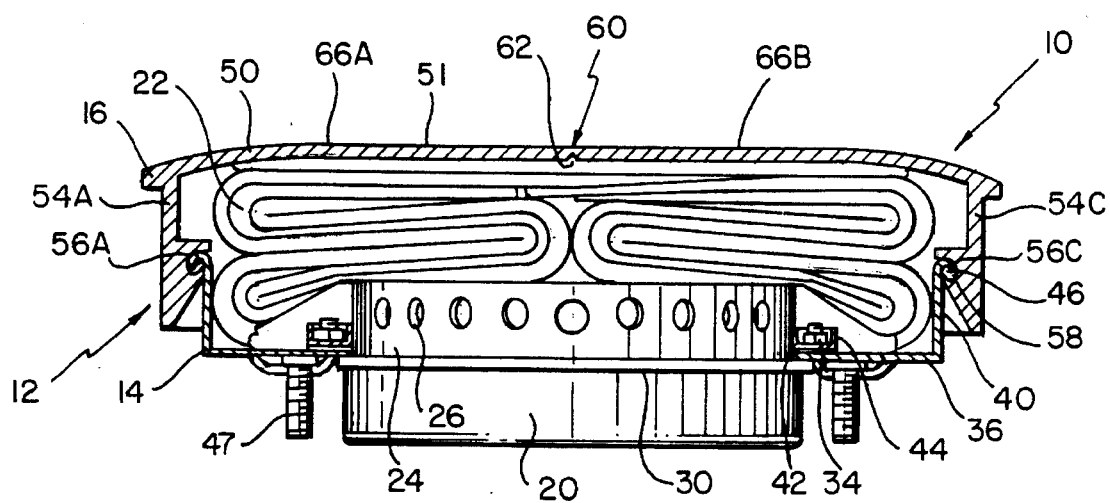
FIG. 1 is a simplified, partial sectional view of an air bag assembly, inflatable restraint system of the prior art.

A typical prior art air bag assembly, inflatable restraint system, generally designated by the reference numeral 10, is shown in FIG. 1. The system 10 includes an outer assembly 12 which includes a supporting member, specifically a reaction housing 14, and a cover 16, adapted for press-fit or snap-on engagement therewith. Such a cover 16 is generally adapted for an air bag deployment opening (not shown), such as occurs in properly actuated air bag assembly inflatable restraint systems. The housing also serves as a base onto which are mounted an inflator 20 and an air bag 22.

The inflator 20 includes an upper portion 24 in which is provided a plurality of gas exit ports 26 whereby gas generated or produced by or in the inflator 20 can be conveyed to the air bag 22. As shown, a flange 30 is provided on an intermediate portion of the inflator 20. The flange 30 facilitates the attachment of the inflator 20 to the housing 14, such as in a manner common in the art. Also, the flange 30 facilitates the attachment of the inflator 20 to the air bag 22, which has a gas inlet opening (not shown) defined by an air bag retaining ring 34 which is typically rounded or circular in shape. The inflator and air bag themselves and the manner of attaching each form no part of the invention and, therefore, will not be further described herein.

The reaction housing 14 is generally rectangular and deep dish-like in shape and includes a bottom 36 and side wall portions 40. The bottom 36 includes an opening 42 into which from the lower side, the upper portion 24 of the inflator 20 may be inserted until the flange 30 abuts the peripheral region of the reaction housing 14 adjacent the opening 42. The air bag retaining ring 34, defining the air bag gas inlet opening and abutting the inflator flange 30, can be fixedly attached, as shown, by rivet nuts 44 or other suitable means to the peripheral region of the opening 42 in the reaction housing 14. An outwardly curved rim 46 occurs at the extreme edge of the reaction housing side wall portions 40. The rim 46 is adapted for engaging with the cover 16 in a secure attachment.

In addition, the air bag assembly, inflatable restraint system 10 includes self-clinching studs 47 whereby the system 10 can be secured within the vehicle (not shown).

The cover 16 generally serves to enclose the housing 14 and the air bag 22. Generally, the housing is shaped to correspond to the shape of the selected cover. Thus, in the case of a rectangular shaped cover, the housing generally also has a rectangular shape.

The cover 16, as the closure panel members described above, is designed to tear or otherwise open along predetermined lines as a result of the force exerted on the closure by way of the inflating air bag and thus form air bag release doors. In this way, and such as in the event of a particular collision by a vehicle so equipped, the air bag will deploy through such an opening to provide desired cushioning to a specifically positioned occupant. Further, as described above with reference to such air bag assemblies for the protection of a vehicle driver, the assembly is situated in the steering wheel of the vehicle, e.g., automobile.

Figure 2:
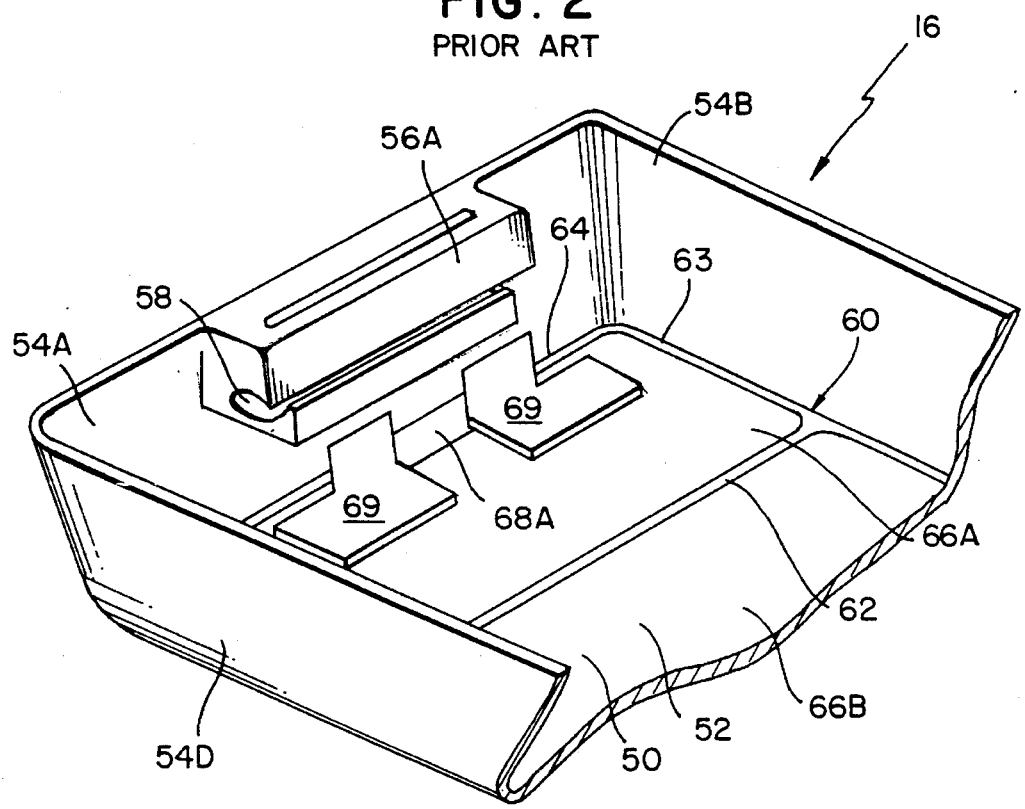
FIG. 2 is a simplified perspective bottom angle fragmentary view of the prior art cover shown in FIG. 1.

The cover 16 is shown in FIG. 1 and in further detail in FIG. 2. The cover 16 includes a substantially flat or planar upper wall face portion 50, having an outer or top side 51 and an inner or bottom side 52, and a side wall mounting portion 54 extending downward from the periphery of the rectangularly shaped upper wall face portion 50. (In FIG. 1, two side walls, respectively designated 54A and 54C, and in FIG. 2, three side walls, respectively designated 54A, 54B and 54D, may be seen.) In general, the upper wall portion is thinner than the side wall portion. Each of the side walls includes a locking arm 56. (In FIG. 1, only two locking arms, respectively designated 56A and 56C, may be seen. Also, FIG. 2 has been simplified to show side wall details, e.g., the locking arm, for only one of the side walls, i.e., the side wall 54A.) The locking arms 56 extend rearwardly from the top side 51 of the upper wall face portion 50 and are integrally molded therewith. The locking arms 56 are preferably independently moveable to facilitate mounting of the cover 16 to the corresponding air bag assembly reaction housing 14.

For attachment of the cover 16 to the housing 14, each of the locking arms 56 includes a notch 58 for receiving a corresponding portion of assembly housing, e.g., the outwardly curved rim 46.

Normally, the air bag 22 is folded and is stored in the space between the inflator 20 and the bottom side 52 of the cover face portion 50. When initiated, such as in response to the onset of a collision, the inflator 20 rapidly generates or produces gas to inflate and expand the air bag 22 to a desired shape, typically spherical.

The cover 16 includes a break-open area at least in part defined by an array 60 of tear ways including center tear way 62, side tear ways 63 and base tear ways 64. The tear ways are typically formed as cover areas of reduced thickness and are thus referred to as "weakened" and whereat the cover 16 splits or otherwise tears when the air bag 22 inflates thereagainst, thereby forming first and second hinged doors, 66A and 66B, respectively. Each of these release doors is joined with the cover mounting portion 54 by means of a hinge portion 68, shown in FIG. 2 as hinge portion 68A with respect door 66A. The doors, 66A and 66B, respectively, open outwardly and oppositely each other, bending around the respective hinge portions to allow the air bag 22 to expand to provide the desired occupant protection function.

As shown in FIG. 2 relative to door 66A and hinge portion 68A and as applicable to both doors 66A and 66B and their respective hinge portion 68, the hinge portion includes one or more thickened areas 69. Such thickening is typically a result of the inclusion of a secondary material of higher tear resistance within this portion of the cover, as described above. Such thickened areas can be of various suitable shapes and are shown as being generally perpendicular to the hinge adjacent tear ways, thereby seeking to avoid the continued tearing of the cover through the respective hinge section.

As described above, a potential problem with such prior art assemblies is the possibility of the cover breaking or fragmenting into separate pieces. For example, in the system 10 described above, the cover 16 upon the onset of the air bag deployment process may be subjected to such forces that the tearing open of the cover can result in continued tearing of the cover such as into and through one or more of the hinge portions 68 whereby one or more of the doors, e.g., doors 66A and 66B, formed upon deployment of the air bag 22 can become disengaged from the system 10 and can thus act as a projectile within the vehicle.

Closures, such as described herein, serve to prevent the door(s) from becoming disengaged from the closure and assembly itself by means of one or more integral retention bridges. Such integral retention bridge or bridges serve to join the movable door or doors to a stationary and secured portion of the closure.

Figure 3:
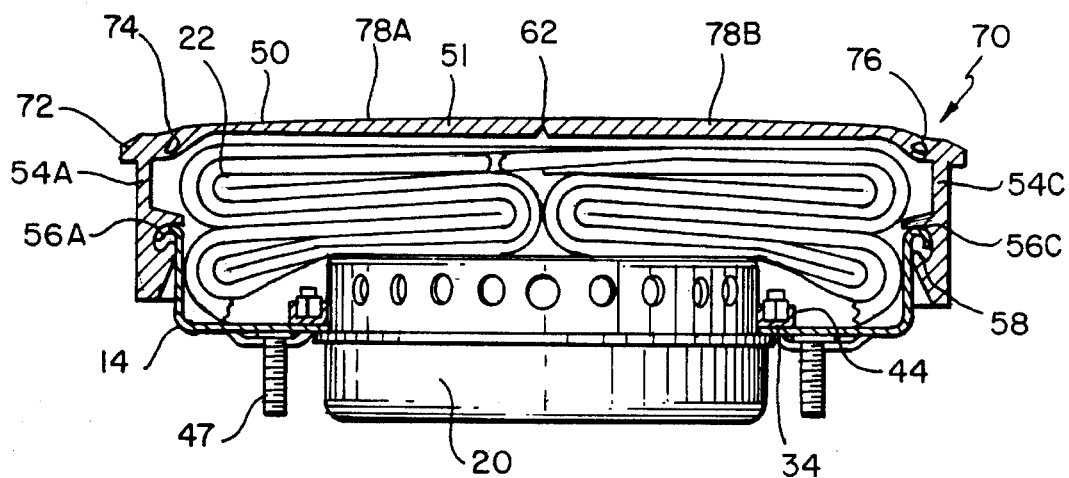
FIG. 3 is a simplified, partial sectional view of an air bag assembly, inflatable restraint system, similar to FIG. 1, but having a closure in accordance one embodiment of the invention.
Figure 4:
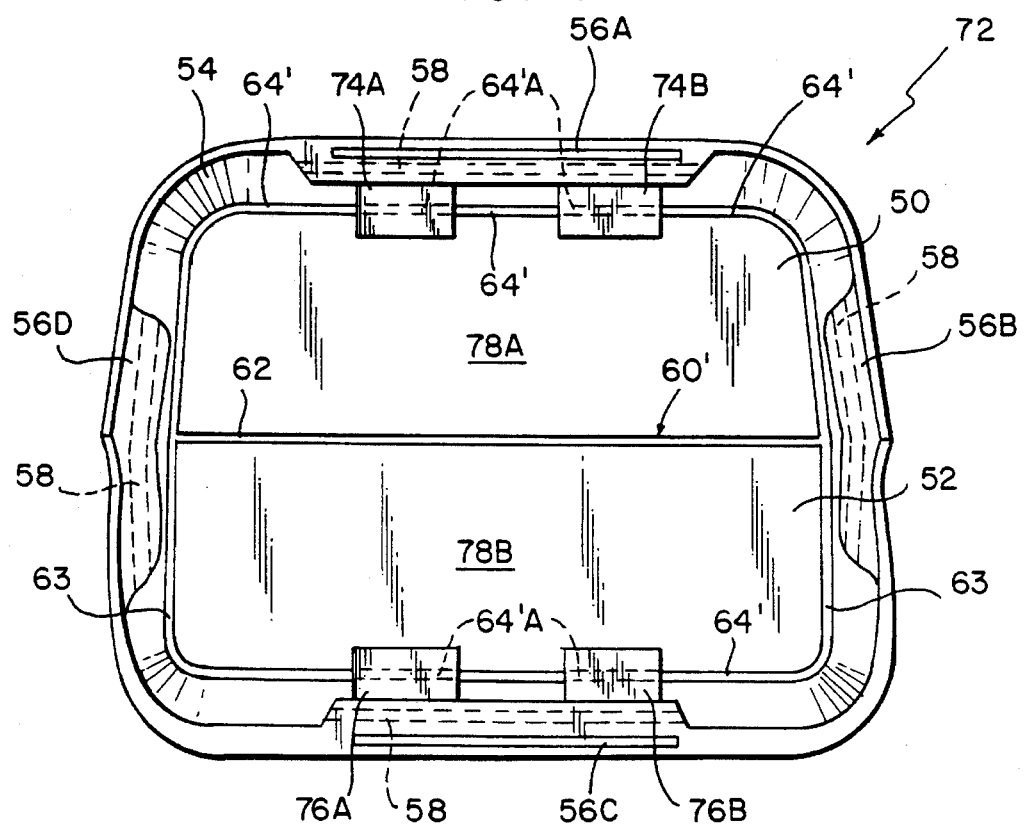
FIG. 4 is a simplified bottom plan view of the closure shown in the shown in FIG. 3.

Turning to FIG. 3, there is illustrated an air bag assembly, inflatable restraint system, generally designated by the reference numeral 70. The system 70 is similar to the system 10, shown in FIG. 1 and described above, in that it includes a reaction housing 4, an inflator 20, an air bag 22, an air bag retaining ring 34, rivet nuts 44, an outwardly curved rim 46 about the housing 12, self-clinching studs 47, etc. The system 70, however, includes a closure element 72 (see also FIGS. 4-6), in accordance with a first embodiment of the invention.

The closure 72 is similar to the cover 16 described above in that it includes an upper wall face portion 50, having an outer or top side 51 and an inner or bottom side 52, and a side wall mounting portion 54 extending downward from the periphery of the rectangularly shaped upper wall face portion 50. (In FIG. 3, two side walls, respectively designated 54A and 54C; in FIG. 4, four side walls, respectively designated 54A, 54B, 54C and 54D; and in FIG. 5 only three of the side walls, i.e., 54A, 54B, and 54D, may be seen.)

As with the above-described cover 16, the side walls 54 of the closure 72 each includes a locking arm 56. (In FIG. 3, only two locking arms, respectively designated 56A and 56C, may be seen. Also, FIG. 5 has been simplified to show side wall details, e.g., the locking arm, for only one of the side walls, i.e., the side wall 54A.) The locking arms 56 extend rearwardly from the top side 51 of the upper wall face portion 50 and are integrally molded therewith. As described above, the locking arms 56 are preferably independently moveable to facilitate mounting of the closure 72.

The closure 72 includes a tear way array 60' which takes the general form of the numeral "8". The tear way array 60' like the tear way array 60 of cover 16, includes a center tear way 62, and side tear ways 63, for example. In the closure 72, the base tear ways 64' rather than abruptly terminating at a thickened hinge portion, as described above relative to the cover 16, are continuous. Thus, such a closure has no hinge portion per se connecting the formed door with the balance of the closure.

The closure 72, however, includes two pairs of integral retention bridges 74 and 76 (individually designated 74A, 74B, 76A, and 76B, respectively), further described below. When the closure 72 splits or otherwise tears such as when, for example, the air bag 22 inflates thereagainst, first and second air bag deployment doors, 78A and 78B, respectively, are formed.

In the closure 72, each of the retention bridges 74 and 76 serve to "bridge" across and parallel at least a portion of the base tear way 64' which "bridged" portions are denominated 64'A, thereby effecting continued joinder of the respectively formed doors with the mounting portion 54 of the closure 72. As described above, the tearing/opening of closures normally proceeds along the path of least resistance and thus, typically results in the opening or tearing of the closure advancing along the thinnest or weakest path through the closure. The closure 72, through the inclusion of the bridged tear way 64'A, serves to direct or channel the opening/tearing along the path of the bridged tear way. Thus, the design of the subject closure helps avoid or minimize the likelihood of the closure tearing in an uncontrolled fashion such as tearing outside of the tear way and such as into or through the hinge section, joining the air bag deployment door with the assembly, or otherwise to result in the air bag closure breaking into or forming separate pieces.

Figure 8:
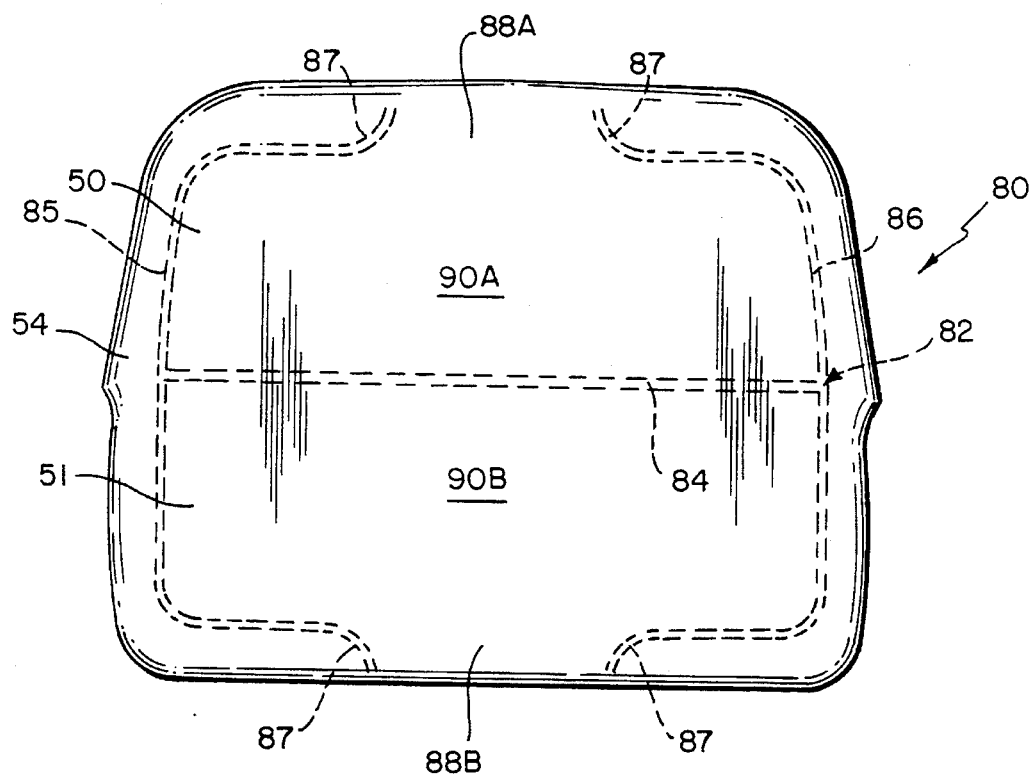
FIG. 8 is a simplified top view of the closure shown in FIG. 1.
Figure 9:
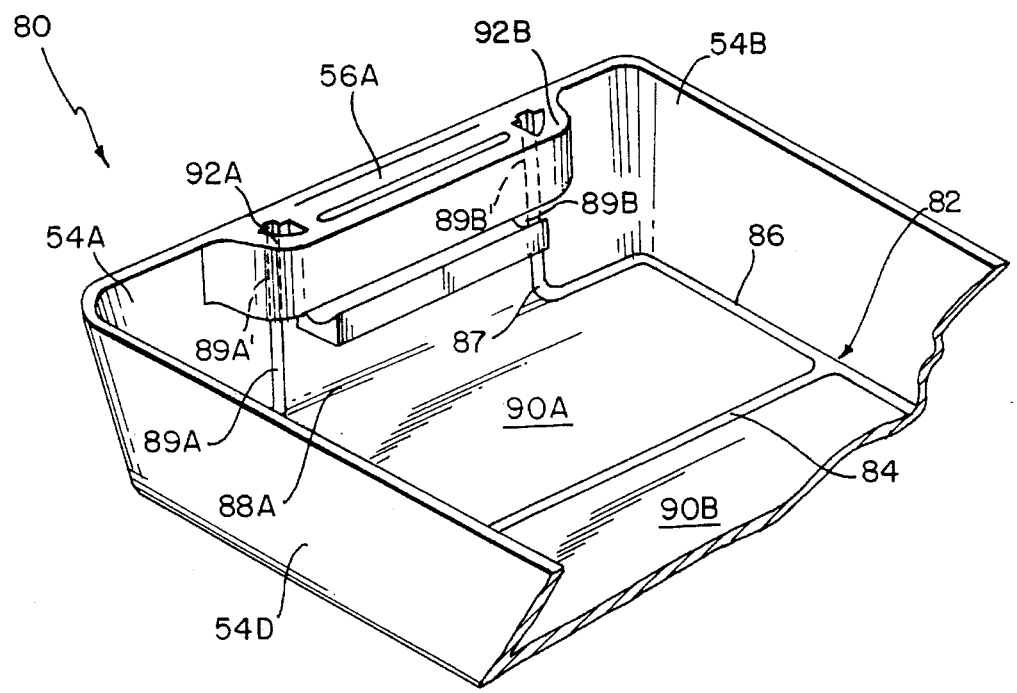
FIG. 9 is a simplified perspective bottom angle fragmentary view, similar to views shown in FIGS. 2 and 5, but now of the closure shown in FIG. 8.

FIGS. 7-9 illustrate a closure 80 for an air bag assembly, inflatable restraint system, in accordance with an alternative embodiment of the invention. The closure 80 is designed for use in an air bag assembly, inflatable restraint system similar to the cover 16 in the system 10, shown in FIG. 1, and the closure 72 in the system 70, shown in FIG. 3. Similar to the cover 16 and the closure 72, described above, the closure 80 includes an upper wall face portion 50, having an outer or top side 51 and an inner or bottom side 52, and a side wall mounting portion 54 extending downward from the periphery of the rectangularly shaped upper wall face portion 50. (In FIG. 7, four side walls, respectively designated 54A, 54B, 54C and 54D and in FIG. 9 three of the side walls, i.e., 54A, 54B, and 54D, may be seen. In addition, to facilitate illustration and comprehension, FIG. 7 has been simplified to show the notch 58 only on the side walls 54B and 54D as the side walls 54A and 54C also incorporate retention bridges in accordance with the invention.)

As with the above-described cover 16 and closure 72, the side walls 54 of the closure 80 each includes a locking arm 56. (FIG. 9 has been simplified to show side wall details, e.g., the locking arm, for only one of the side walls, i.e., the side wall 54A.) The locking arms 56 extend rearwardly from the top side 51 of the upper wall face portion 50 and are integrally molded therewith. As describe above, the locking arms 56 are preferably independently moveable to facilitate mounting of the closure 80.

The closure 80, however, incorporates a tear way array 82 wherein tear ways are generally situated in the form of the letter H. The tear way array 82, in addition to a center tear way 84 which generally corresponds to the cross bar of the letter H, includes: a) first and second side tear ways, 85 and 86, respectively, which generally correspond to the side bars of the letter H, as viewed in FIGS. 7–8; b) a curved section of tear way, designated 87, at each end of each of the side tear ways 85 and 86, and leading into a hinge section 88A and 88B, respectively, adjacent the locking arms 56A and 56C, respectively; and c) terminal tear way segments 89A and 89B.

When the closure 80 splits or otherwise tears such as when an air bag inflates thereagainst, for example, first and second air bag deployment doors, 90A and 90B, respectively, are formed. After the tear ways 82 have split or torn to form the doors 90A and 90B, the hinge sections 88A and 88B are each adapted to join one of the release doors 90A and 90B, respectively, with the mounting portion 54.

As in the above-described first embodiment of the invention, the closure 80 includes integral retention bridges, here designated 92A and 92B, respectively, which serve to further join each of the doors, 90A and 90B, respectively, with the respective mounting portion, e.g., side wall mounting portion 54. Each of these retention bridges serves to "bridge" across and parallel at least a portion of the tear ways 82 of the closure 80, e.g., terminal tear way segments 89A and 89B and which "bridged" portions are denominated 89A' and 89B', respectively. Thus, the retention bridges 92A and 92B serve to join doors 90A and 90B, respectively, with the side wall mounting portion 54 even in the event that the tearing action of the closure undesirably continues in or through the closure 80, such as through the mounting portion 54 or through either of the hinge sections 88A or 88B, for example.

While the invention has been described above with reference to closure elements wherein the integral retention bridge of the invention joins a door with a mounting portion across and parallel a preformed tear way, it will be appreciated that the integral retention bridge of the invention also has applicability to closures wherein, relative to the bridge, there is no underlying or overlying tear way.

Figure 10:
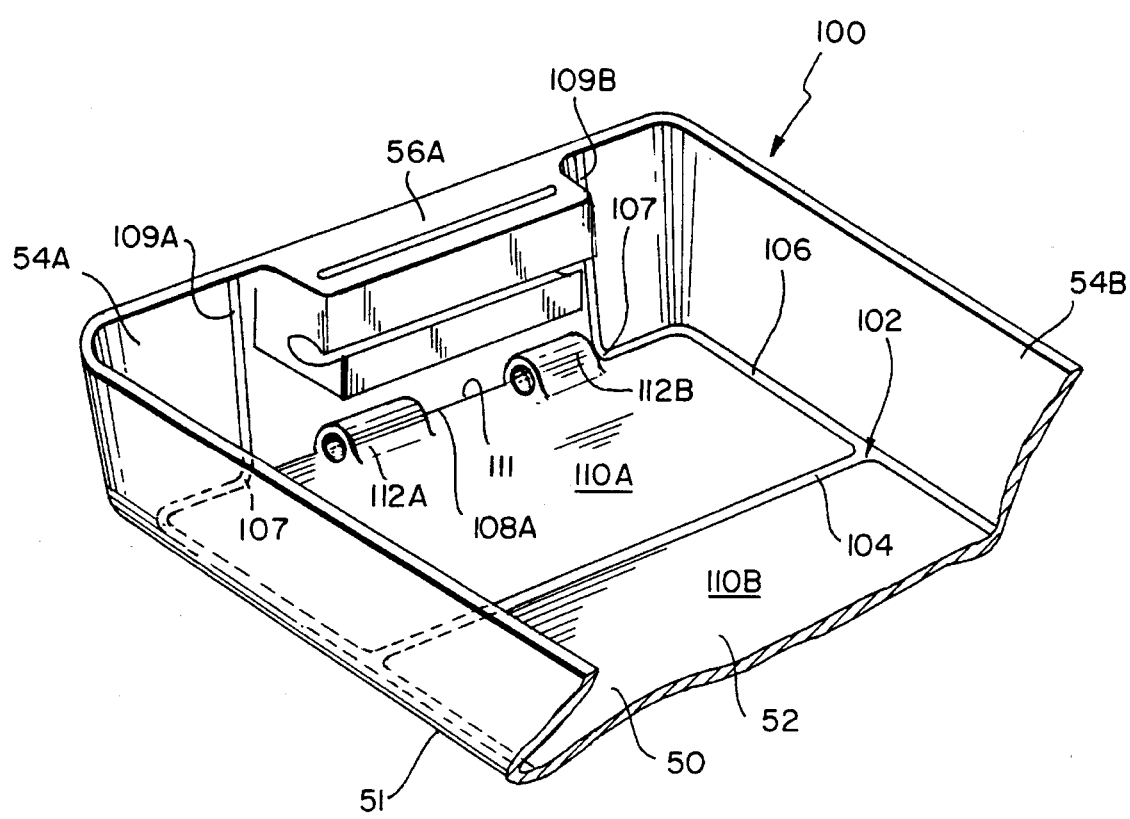
FIG. 10 is a simplified perspective bottom angle fragmentary view, similar to FIG. 2, of a closure in accordance with an alternative embodiment of the invention.

For example, turning to FIG. 10 there is illustrated a closure element 100 similar to the cover 16 and closures 72 and 80 described above in the closure element 100 includes an upper wall face portion 50, having an outer or top side 51 and an inner or bottom side 52, and a side wall mounting portion 54 extending downward from the periphery of the rectangularly shaped upper wall face portion 50. (In FIG. 10, three of the side walls, i.e., 54A, 54B, and 54D, may be seen.)

As in the above described embodiments, the locking arms 56 generally extend rearwardly from the top side 51 of the upper wall face portion 50 and are integrally molded therewith. (FIG. 10 has been simplified to show side wall details, e.g., the locking arm 56, for only side wall 54.) As described above, the locking arms 56 are preferably independently moveable to facilitate mounting of the closure 100.

The closure 100, however, incorporates a tear way array 102 wherein tear ways are generally situated in the form of the letter H, similar to the tear way array 82 of the closure 80. The tear way array 102, in addition to a center tear way 104 which generally corresponds to the cross bar of the letter H, includes: a) first and second side tear ways which generally correspond to the side bars of the letter H (in FIG. 10, only second side tear way 106 is shown, it is to be understood that the first side tear way is similar to the tear way 85 shown in FIGS. 7 and 8); b) a curved section of tear way, designated 107, which leads into a hinge section 108 (here designated as hinge section 108A adjacent the locking arm 56A, the opposing hinge section is not shown in the figure); and c) terminal tear way segments 109A and 109B.

When the closure 100 splits or otherwise tears such as when an air bag inflates thereagainst, for example, first and second air bag deployment doors, 110A and 110B, respectively, are formed. As shown in FIG. 10, the hinge section 108A forms a hinge 111 adapted to join the release door 110A with the mounting portion 54. In general, it is to be understood that similar arrangement (not shown) can be made for the release door 110B.

As in the above-described first embodiment of the invention, the closure 100 includes integral retention bridges, here shown and designated as retention bridges 112A and 112B, which serve to further join each of the door 110A with the respective mounting portion, e.g., side wall mounting portion 54. The embodiment of the invention illustrated in FIG. 10, however, differs from the above-described embodiments in that the integral retention bridges 112 do not "bridge" across a preformed tear way. Rather, each of the integral retention bridges 112 runs parallel to a hinge, e.g., the hinge 111, joining the door 110A with the mounting portion 54A. It will be appreciated that a similar arrangement can be made for the door 110B and its associated hinge (not shown). Thus, through means of the retention bridge, this embodiment permits a door to remain joined to the mounting portion of the closure even in the event that the tearing action of the tear way inadvertently propagates into and through the hinge joining the door with the mounting portion.

In addition, such retention bridges can serve to maintain joinder between the door and the mounting portion of the closure even for those closure designs wherein the material making up the hinge is subjected to particularly high stresses, e.g., closures wherein the hinge has a relatively sharp radius of curvature such as a radius of about 0.25 in.

It is to be appreciated that as retention bridges as herein described are not in the direct path of tearing action initiated in and propagating from tear ways, e.g., preformed tear ways. Thus, any tearing of such bridges would necessitate that the tearing action rather than simply propagating, e.g., continuing to tear beyond the tear way, must first initiate in the bridge material itself. In general, such retention bridges are not subject to such tearing action for, as described above, when compared to tear propagation undesired tear initiation is generally a more difficult proposition and occurs relatively infrequently.

The closure element of the invention does not require the introduction of a secondary material therein to prevent door detachment, thus simplifying manufacture. In addition, rather than reinforced urethane as has been commonly used for previous inflatable restraint system covers, the invention permits the greater use of generally less expensive thermoplastic materials for use in the construction of such closure elements as the closure elements of the invention reduce the risks of door detachment/separation. Furthermore, it is to also be understood that if desired such retention bridges can be used in conjunction with closures, as described above, having secondary material reinforcements. For example, the inclusion of such retention bridges in a so designed closure can provide greater assurance of avoidance of door detachment.

As described above, the closures of the invention are generally in the form of a one piece element, e.g., a single unitary item of fabrication wherein the one or more retention bridges are integrally formed. Typically, such a one piece element can be formed via molding fabrication, e.g., one-shot injection molding. In one preferred embodiment, the closure of the invention is a one piece molded homogeneous member in that no reinforcements are molded into it. An injection moldable material, particularly a high pressure injection molding material such as a thermoplastic is preferred. A currently preferred material for use for the closures of the invention is a thermoplastic rubber such as SANTOPRENE.

Furthermore, even when used in conjunction with high pressure inflators such as those producing gas pressures in the range of from about 450–475 kPa up to about 650 kPa as determined as described above, the closure element of the invention is generally effective in avoiding the above-described problem of door detachment without requiring the incorporation therein of a tear resistant, secondary material. Thus, the invention facilitates manufacture and provides greater flexibility in the design of specific closure elements and the inflatable restraint systems in which they are incorporated.

It is to be understood that in the closure elements of the invention utilizing such integral retention bridges, various interrelated parameters relating to such retention bridge design, e.g., parameters such as the number, thickness, spacing, location, and width of each such retention bridge, can be appropriately varied to satisfy the needs for specific applications. Factors to be considered in such closure designs include: inflator performance, door mass and thickness, and material of construction, contour, and hinge width of the closure. For specific applications, such design related parameters are determinable by one skilled in the art and guided by the teachings herein.

While the invention has been described above in reference to use in conjunction with a snap-on or press-fit type moldable plastic assembly cover it is to be understood that the invention is not so limited and can be used in conjunction with not only other types or forms of covers but also with covers prepared from various materials of construction. Furthermore, the practice of the subject invention in its broader aspects is not limited to use with any particular form or means of attachment of the closure to the housing. Thus, alternative forms or means of attachment as are known in the art, such as those that rely on the use of fastener devices such as screws or rivets, for example, can be used in a common manner to effect attachment of the closure to the housing.

As is evident from the above-described embodiments, it is to be understood that the practice of the invention is not limited to use in conjunction with closures having tear ways of any particular shape or form, e.g., the invention is not limited to use in conjunction with closures having tear ways in the form of the numeral 8 or the letter H.

Also, while the invention has been illustrated herein in conjunction with closures which form pairs of air bag release doors, it is to be understood that the invention and the use of one or more retention bridges can, if desired, be used in conjunction with closures which form only one such air bag release door.

Nor does the invention require that the door or doors form as a result of an air bag inflating thereagainst. For example, the closure may contain one or more ignition materials whereby door formation and opening occurs before the air bag has inflated thereagainst.

In the illustrated embodiments, the upper wall face portions 50 of the closures are shown as a substantially flat or planar member. It is to be understood, however, that the geometrical form of the closure and specifically the face portion thereof can be appropriately altered or shaped so as to better match or conform to specific desired application locations or sites.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A closure element for an air bag deployment opening of an inflatable restraint system adapted to be integrated into a vehicle with the system including a housing for accommodating a collapsed inflatable air bag, said closure element comprising:

a mounting portion securable to the housing and a face portion and having therein a tear way adapted to tear to define at least one air bag release door with said closure element having at least one integral retention bridge joining said door with said mounting portion across and parallel at least a portion of said tear way, said retention bridge looping over said tear way to form an arc so as to keep said retention bridge out of the path of said tear way thereby preventing tearing of the retention bridge during deployment of the air bag.

2. The closure element of claim 1 wherein said tear way is continuous and in a numeral "8" shaped pattern defining at least two air bag release doors.

3. The closure element of claim 1 comprising a homogeneous molded plastic member.

4. The closure element of claim 1 for use in an inflatable restraint system having a high pressure inflator.

5. The closure element of claim 4 wherein said high pressure inflator has a gas pressure in the range of from about 450–475 kPa up to about 650 kPa.

6. The closure element of claim 1 prepared via injection molding of a thermoplastic rubber.

7. The closure element of claim 1 for a driver side air bag deployment opening located in the steering wheel of the vehicle.

8. A closure element for an air bag deployment opening of an inflatable restraint system adapted to be integrated into a vehicle with the system including a housing for accommodating a collapsed inflatable air bag, said closure element comprising:

a mounting portion securable to the housing and a face portion and having therein a tear way adapted to tear to define at least one air bag release door with a hinge section adapted to join said release door with said mounting portion and with said tear way extending into said hinge section, said closure element additionally having at least one integral retention bridge joining said door with said mounting portion across and parallel at least a portion of said tear way, said retention bridge looping over said tear way to form an arc so as to keep said retention bridge out of the path of said tear way thereby preventing tearing of the retention bridge during deployment of the air bag.

9. The closure element of claim 8 wherein said tear way forms a generally H-shaped pattern defining at least two air bag release doors.

10. The closure element of claim 8 comprising a homogeneous molded plastic member.

11. The closure element of claim 8 for use in an inflatable restraint system having a high pressure inflator.

12. The closure element of claim 11 wherein said high pressure inflator has a gas pressure in the range of from about 450–475 kPa up to about 650 kPa.

13. The closure element of claim 8 prepared via injection molding of a thermoplastic rubber.

14. The closure element of claim 8 for a driver side air bag deployment opening located in the steering wheel of the vehicle.

15. A molded plastic closure element for an air bag deployment opening of an inflatable restraint system adapted to be integrated into a vehicle with the system including a housing for accommodating a collapsed inflatable air bag, said closure element comprising a one piece element including:

a mounting portion securable to the housing, a face portion having therein a tear way adapted to tear to define at least one air bag release door, at least one hinge section forming a hinge adapted to join said release door with said mounting portion, and at least one integral retention bridge additionally joining said door with said mounting portion, said retention bridge looping over at least one of said hinge section and said tear way to form an arc so as to keep said retention bridge out of the path of said tear way thereby preventing tearing of the retention bridge during deployment of the air bag.

16. The molded plastic closure element of claim 15 wherein said at least one integral retention bridge runs parallel to said hinge from said door to said mounting portion.

17. The molded plastic closure element of claim 15 wherein said tear way forms a generally H-shaped pattern defining at least two air bag release doors.

18. The molded plastic closure element of claim 15 prepared via injection molding of a thermoplastic rubber.

19. The molded plastic closure element of claim 15 wherein said closure element is a homogeneous member.

20. The molded plastic closure element of claim 15 wherein said closure element additionally comprises a secondary reinforcement material within said hinge.

* * * * *